US009769569B1

(12) United States Patent
Kulavik

(10) Patent No.: US 9,769,569 B1
(45) Date of Patent: *Sep. 19, 2017

(54) GAMING HEADSET WITH VOICE SCRAMBLING FOR PRIVATE IN-GAME CONVERSATIONS

(71) Applicant: Voyetra Turtle Beach, Inc., Valhalla, NY (US)

(72) Inventor: Richard Kulavik, San Jose, CA (US)

(73) Assignee: Voyetra Turtle Beach, Inc., Valhalla, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/207,040

(22) Filed: Jul. 11, 2016

Related U.S. Application Data

(63) Continuation of application No. 14/445,461, filed on Jul. 29, 2014, now Pat. No. 9,392,355.

(60) Provisional application No. 61/879,985, filed on Sep. 19, 2013.

(51) Int. Cl.
*H04R 1/10* (2006.01)
*H04R 5/033* (2006.01)
*H04R 5/04* (2006.01)
*G06F 3/16* (2006.01)

(52) U.S. Cl.
CPC ............ *H04R 5/033* (2013.01); *G06F 3/165* (2013.01); *H04R 1/1041* (2013.01); *H04R 5/04* (2013.01)

(58) Field of Classification Search
CPC ......... H04R 5/033; H04R 5/04; H04R 1/1041
USPC ...... 381/104, 107, 91–92, 122, 74, 370, 376
See application file for complete search history.

(56) References Cited

U.S. PATENT DOCUMENTS

| 4,167,700 | A | 9/1979 | Coe |
| 4,268,720 | A | 5/1981 | Olberg et al. |
| 4,903,298 | A * | 2/1990 | Cline ................. H04K 1/00 380/270 |
| 6,192,135 | B1 * | 2/2001 | Monopoli ............ H04R 27/00 381/95 |
| 8,879,751 | B2 | 11/2014 | Bonanno |
| 8,964,830 | B2 * | 2/2015 | Perlman .............. H04N 21/231 345/161 |
| 2008/0118086 | A1 | 5/2008 | Krig |
| 2009/0003637 | A1 * | 1/2009 | Pansell ................. H04R 25/55 381/314 |
| 2010/0040240 | A1 | 2/2010 | Bonanno |

(Continued)

*Primary Examiner* — Disler Paul
(74) *Attorney, Agent, or Firm* — McAndrews, Held & Malloy

(57) ABSTRACT

An electronic device may be configurable to operate in a scrambling mode and a non-scrambling mode while processing chat audio and microphone audio for a first player participating in an online multiplayer game via a game console. While operating in the non-scrambling mode, the electronic device may be configured to transmit the microphone audio to the game console without scrambling the microphone audio. While operating in the scrambling mode, the electronic device may be configured to scramble the microphone audio and transmit the scrambled microphone audio to the game console. The electronic device may be operable to select a scrambling key used to scramble the microphone audio based on a signal received by the electronic device that indicates a role of the player in the online multiplayer game. The role of the player may correspond to which of two or more opposing teams the first player is a member of in the online multiplayer game.

32 Claims, 13 Drawing Sheets

(56) References Cited

U.S. PATENT DOCUMENTS

| | | | |
|---|---|---|---|
| 2011/0158430 A1* | 6/2011 | Dicks | H03G 3/341 381/104 |
| 2012/0120218 A1* | 5/2012 | Flaks | G10L 21/028 348/77 |
| 2012/0189140 A1* | 7/2012 | Hughes | H04M 3/56 381/123 |

* cited by examiner

GAMING HEADSET WITH VOICE SCRAMBLING FOR PRIVATE IN-GAME CONVERSATIONS

PRIORITY CLAIM

This application is a continuation of U.S. patent application Ser. No. 14/445,461 filed on Jul. 29, 2014, which claims the benefit of priority to U.S. provisional patent application 61/879,985 titled "Gaming Headset with Voice Scrambling for Private In-Game Conversations," which is hereby incorporated herein by reference in its entirety.

INCORPORATION BY REFERENCE

U.S. patent application Ser. No. 13/040,144 titled "Gaming Headset with Programmable Audio" and published as US2012/0014553 is hereby incorporated herein by reference in its entirety.

TECHNICAL FIELD

Aspects of the present application relate to electronic gaming. More specifically, to methods and systems for gaming headset with voice scrambling for private in-game conversations.

BACKGROUND

Limitations and disadvantages of conventional approaches to audio processing for gaming will become apparent to one of skill in the art, through comparison of such approaches with some aspects of the present method and system set forth in the remainder of this disclosure with reference to the drawings.

BRIEF SUMMARY

Methods and systems are provided for gaming headset with voice scrambling for private in-game conversations, substantially as illustrated by and/or described in connection with at least one of the figures, as set forth more completely in the claims.

DETAILED DESCRIPTION

Figure 1A:
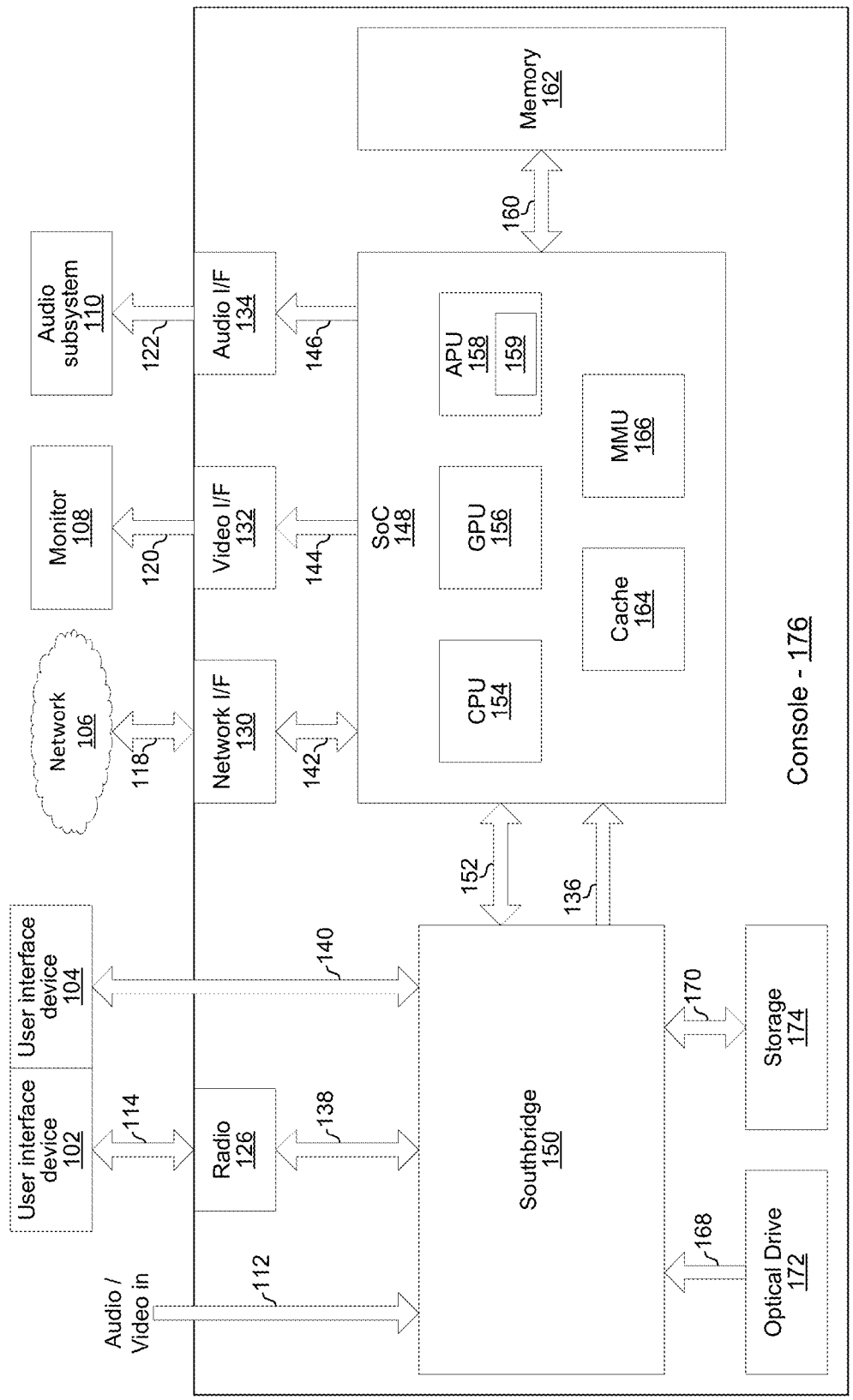
FIG. 1A depicts an example gaming console.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting.

Referring to FIG. 1, there is shown game console 176 which may be, for example, a Windows computing device, a Unix computing device, a Linux computing device, an Apple OSX computing device, an Apple iOS computing device, an Android computing device, a Microsoft Xbox, a Sony Playstation, a Nintendo Wii, or the like. The example game console 176 comprises a video interface 124, radio 126, data interface 128, network interface 130, video interface 132, audio interface 134, southbridge 150, main system on chip (SoC) 148, memory 162, optical drive 172, and storage device 174. The SoC 148 comprises central processing unit (CPU) 154, graphics processing unit (GPU) 156, audio processing unit (APU) 158, cache memory 164, and memory management unit (MMU) 166. The various components of the game console 176 are communicatively coupled through various busses/links 136, 128, 142, 14, 146, 152, 160, 169, and 170.

The southbridge 150 comprises circuitry that supports one or more data bus protocols such as High-Definition Multimedia Interface (HDMI), Universal Serial Bus (USB), Serial Advanced Technology Attachment 2 (SATA 2), embedded multimedia card interface (e.MMC), Peripheral Component Interconnect Express (PCIe), or the like. The southbridge 150 may receive audio and/or video from an external source via link 112 (e.g., HDMI), from the optical drive (e.g., Blu-Ray) 172 via link 168 (e.g., SATA 2), and/or from storage 174 (e.g., hard drive, FLASH memory, or the like) via link 170 (e.g., SATA 2 and/or e.MMC). Digital audio and/or video is output to the SoC 148 via link 136 (e.g., CEA-861-E compliant video and IEC 61937 compliant audio). The southbridge 150 exchanges data with radio 126 via link 138 (e.g., USB), with external devices via link 140 (e.g., USB), with the storage 174 via the link 170, and with the SoC 148 via the link 152 (e.g., PCIe).

The radio 126 comprises circuitry operable to communicate in accordance with one or more wireless standards such as the IEEE 802.11 family of standards, the Bluetooth family of standards, and/or the like.

The network interface 130 may comprise circuitry operable to communicate in accordance with one or more wired standards and to convert between wired standards. For example, the network interface 130 may communicate with the SoC 148 via link 142 using a first standard (e.g., PCIe) and may communicate with the network 106 using a second standard (e.g., gigabit Ethernet).

The video interface 132 may comprise circuitry operable to communicate video in accordance with one or more wired or wireless video transmission standards. For example, the video interface 132 may receive CEA-861-E compliant video data via link 144 and encapsulate/format/etc., the video data in accordance with an HDMI standard for output to the monitor 108 via an HDMI link 120.

The audio interface 134 may comprise circuitry operable to communicate audio in accordance with one or more wired or wireless audio transmission standards. For example, the audio interface 134 may receive CEA-861-E compliant video data via link 144 and encapsulate/format/etc. the video data in accordance with an HDMI standard for output to the monitor 108 via an HDMI link 120.

The central processing unit (CPU) 154 may comprise circuitry operable to execute instructions for controlling/coordinating the overall operation of the game console 176. Such instructions may be part of an operating system of the console and/or part of one or more software applications running on the console.

The graphics processing unit (GPU) 156 may comprise circuitry operable to perform graphics processing functions such as compression, decompression, encoding, decoding, 3D rendering, and/or the like.

The audio processing unit (APU) 158 may comprise circuitry operable to perform audio processing functions such as volume/gain control, compression, decompression, encoding, decoding, surround-sound processing, and/or the like to output single channel or multi-channel (e.g., 2 channels for stereo or 5, 7, or more channels for surround sound) audio signals. The APU 158 comprises memory (e.g., volatile and/or non-volatile memory) 159 which stores parameter settings affect processing of audio by the APU 158. For example, the parameter settings may include a first audio gain/volume setting that determines, at least in part, a volume of game audio output by the console 176 and a second audio gain/volume setting that determines, at least in part, a volume of chat audio output by the console 176. The parameter settings may be modified via a graphical user interface (GUI) of the console and/or via an application programming interface (API) provided by the console 176.

The cache memory 164 comprises high-speed memory (typically DRAM) for use by the CPU 154, GPU 156, and/or APU 158. The memory 162 may comprise additional memory for use by the CPU 154, GPU 156, and/or APU 158. The memory 162, typically DRAM, may operate at a slower speed than the cache memory 164 but may also be less expensive than cache memory as well as operate at a higher-speed than the memory of the storage device 174. The MMU 166 controls accesses by the CPU 154, GPU 156, and/or APU 158 to the memory 162, the cache 164, and/or the storage device 174.

In FIG. 1A, the example game console 176 is communicatively coupled to a user interface device 102, a user interface device 104, a network 106, a monitor 108, and audio subsystem 110.

Each of the user interface devices 102 and 104 may comprise, for example, a game controller, a keyboard, a motion sensor/position tracker, or the like. The user interface device 102 communicates with the game console 176 wirelessly via link 114 (e.g., Wi-Fi Direct, Bluetooth, and/or the like). The user interface device 102 communicates with the game console 176 via the wired link 140 (e.g., USB or the like).

The network 160 comprises a local area network and/or a wide area network. The game console 176 communicates with the network 106 via wired link 118 (e.g., Gigabit Ethernet).

The monitor 108 may be, for example, a LCD, OLED, or PLASMA screen. The game console 176 sends video to the monitor 108 via link 120 (e.g., HDMI).

The audio subsystem 110 may be, for example, a headset, a combination of headset and audio basestation, or a set of speakers and accompanying audio processing circuitry. The game console 176 sends audio to the subsystem 110 via link(s) 122 (e.g., S/PDIF for digital audio or "line out" for analog audio). Additional details of an example audio subsystem 110 are described below.

Figure 1B:
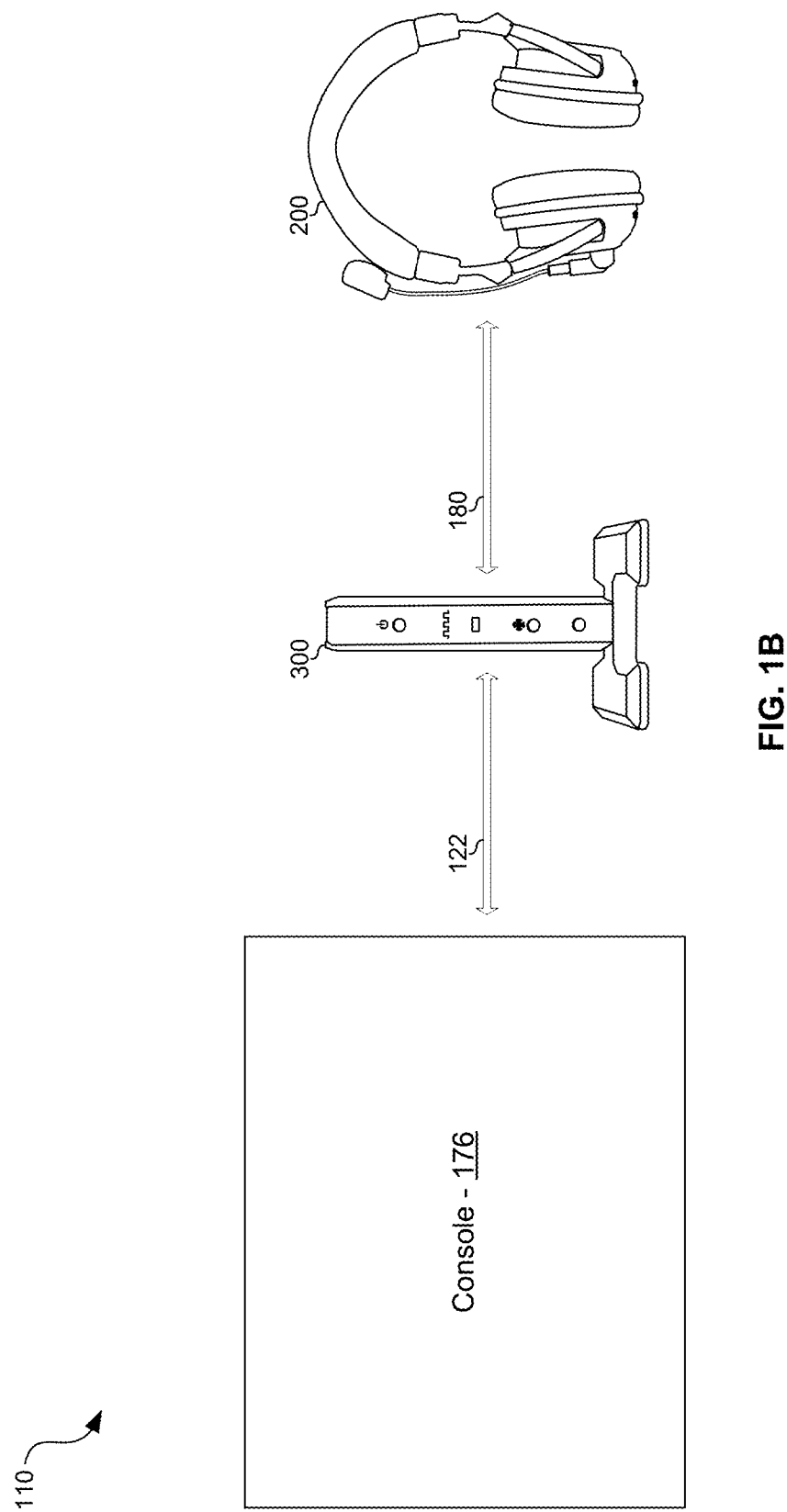
FIG. 1B depicts an example gaming audio subsystem comprising a headset and an audio basestation.
Figure 1C:
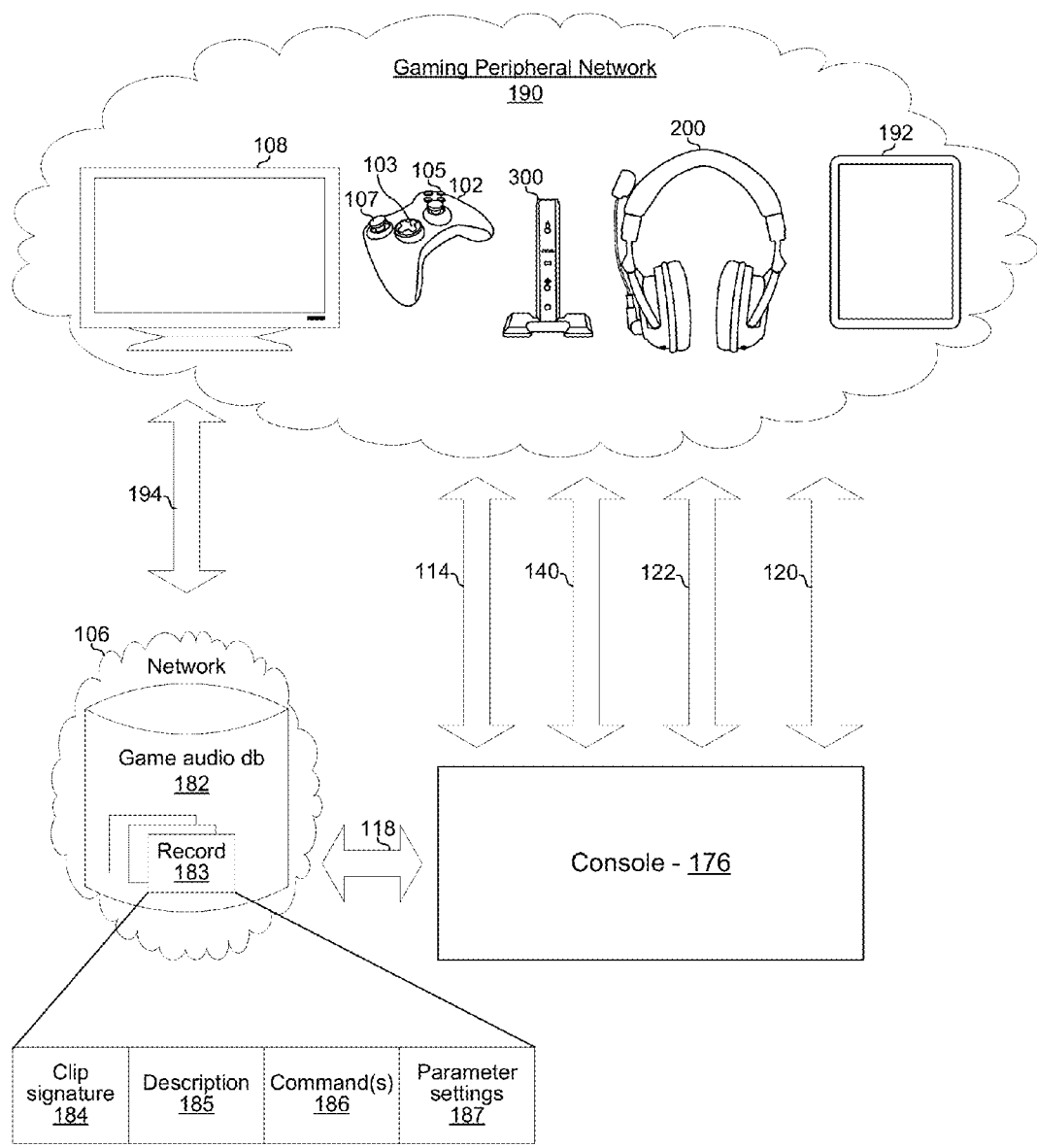
FIG. 1C depicts the example gaming console and an associated network of peripheral devices.

FIG. 1B depicts an example gaming audio subsystem comprising a headset and an audio basestation. Shown is a headset 200 and an audio basestation 300. The headset 200 communicates with the basestation 300 via a link 180 and the basestation 300 communicates with the console 176 via a link 122. The link 122 may be as described above. In an example implementation, the link 180 may be a proprietary wireless link operating in an unlicensed frequency band. The headset 200 may be as described below with reference to FIGS. 2A-2C. The basestation 300 may be as described below with reference to FIGS. 3A-3B.

Referring to FIG. 1C, again shown is the console 176 connected to a plurality of peripheral devices and a network 106. The example peripheral devices shown include a monitor 108, a user interface device 102, a headset 200, an audio basestation 300, and a multi-purpose device 192.

The monitor 108 and user interface device 102 are as described above. An example implementation of the headset 200 is described below with reference to FIGS. 2A-2C. An example implementation of the audio basestation is described below with reference to FIGS. 3A-3B.

The multi-purpose device 192 may be, for example, a tablet computer, a smartphone, a laptop computer, or the like and that runs an operating system such as Android, Linux, Windows, iOS, OSX, or the like. An example implementation of the multi-purpose device 192 is described below with reference to FIG. 4. Hardware (e.g., a network adaptor) and software (i.e., the operating system and one or more applications loaded onto the device 192) may configure the device 192 for operating as part of the GPN 190. For example, an application running on the device 192 may cause display of a graphical user interface via which a user can access gaming-related data, commands, functions, parameter settings, etc. and via which the user can interact with the console 176 and the other devices of the GPN 190 to enhance his/her gaming experience.

The peripheral devices 102, 108, 192, 200, 300 are in communication with one another via a plurality of wired and/or wireless links (represented visually by the placement of the devices in the cloud of GPN 190). Each of the peripheral devices in the gaming peripheral network (GPN)

190 may communicate with one or more others of the peripheral devices in the GPN 190 in a single-hop or multi-hop fashion. For example, the headset 200 may communicate with the basestation 300 in a single hop (e.g., over a proprietary RF link) and with the device 192 in a single hop (e.g., over a Bluetooth or Wi-Fi direct link), while the tablet may communicate with the basestation 300 in two hops via the headset 200. As another example, the user interface device 102 may communicate with the headset 200 in a single hop (e.g., over a Bluetooth or Wi-Fi direct link) and with the device 192 in a single hop (e.g., over a Bluetooth or Wi-Fi direct link), while the device 192 may communicate with the headset 200 in two hops via the user interface device 102. These example interconnections among the peripheral devices of the GPN 190 are merely examples, any number and/or types of links among the devices of the GPN 190 is possible.

The GPN 190 may communicate with the console 176 via any one or more of the connections 114, 140, 122, and 120 described above. The GPN 190 may communicate with a network 106 via one or more links 194 each of which may be, for example, Wi-Fi, wired Ethernet, and/or the like.

A database 182 which stores gaming audio data is accessible via the network 106. The gaming audio data may comprise, for example, signatures of particular audio clips (e.g., individual sounds or collections or sequences of sounds) that are part of the game audio of particular games, of particular levels/scenarios of particular games, particular characters of particular games, etc. In an example implementation, the database 182 may comprise a plurality of records 183, where each record 183 comprises an audio clip (or signature of the clip) 184, a description of the clip 184 (e.g., the game it is from, when it occurs in the game, etc.), one or more gaming commands 186 associated with the clip, one or more parameter settings 187 associated with the clip, and/or other data associated with the audio clip. Records 183 of the database 182 may be downloadable to, or accessed in real-time by, one of more devices of the GPN 190.

Figure 2A:
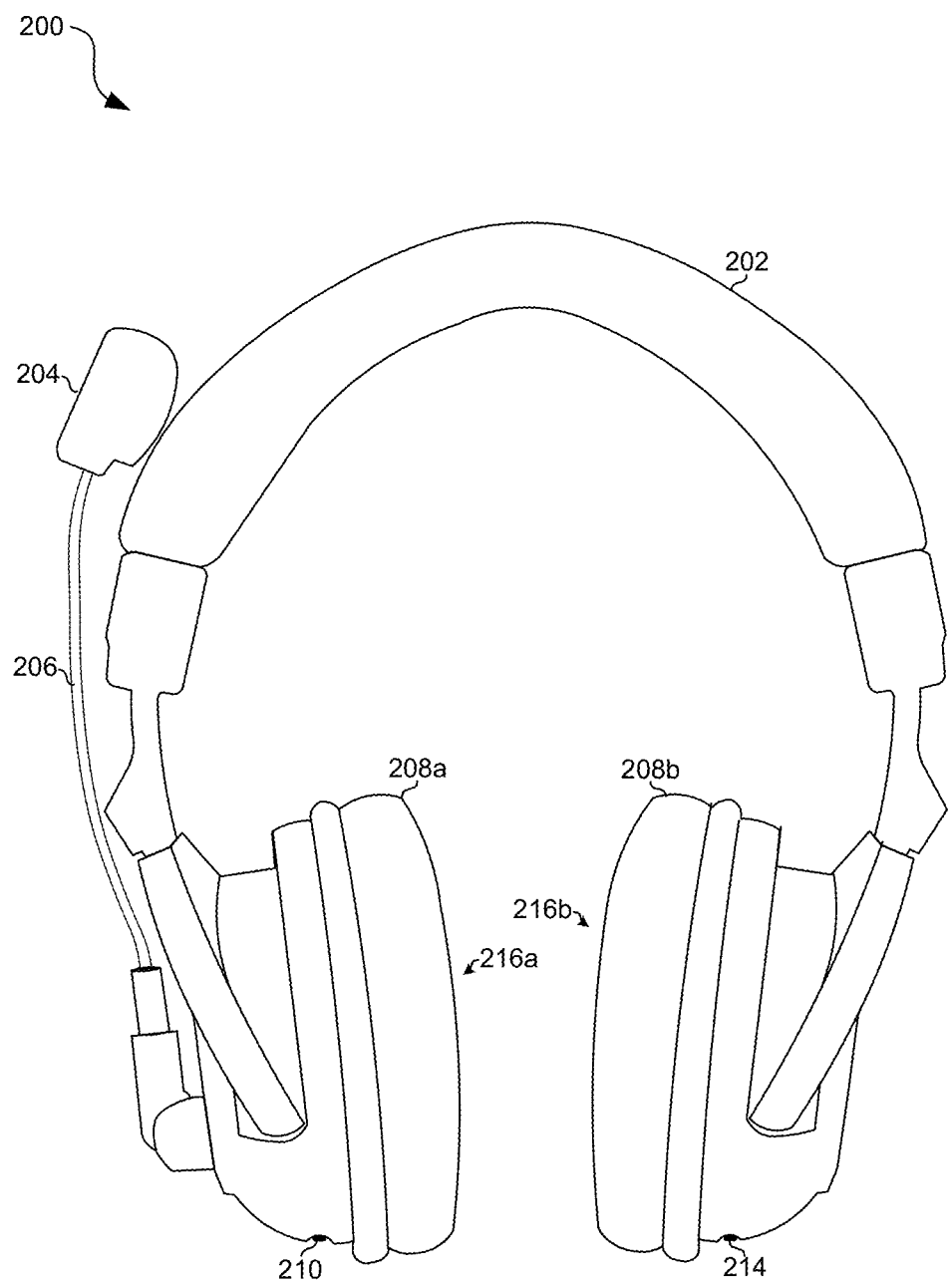
FIGS. 2A and 2B depict two views of an example embodiment of a gaming headset.
Figure 2B:
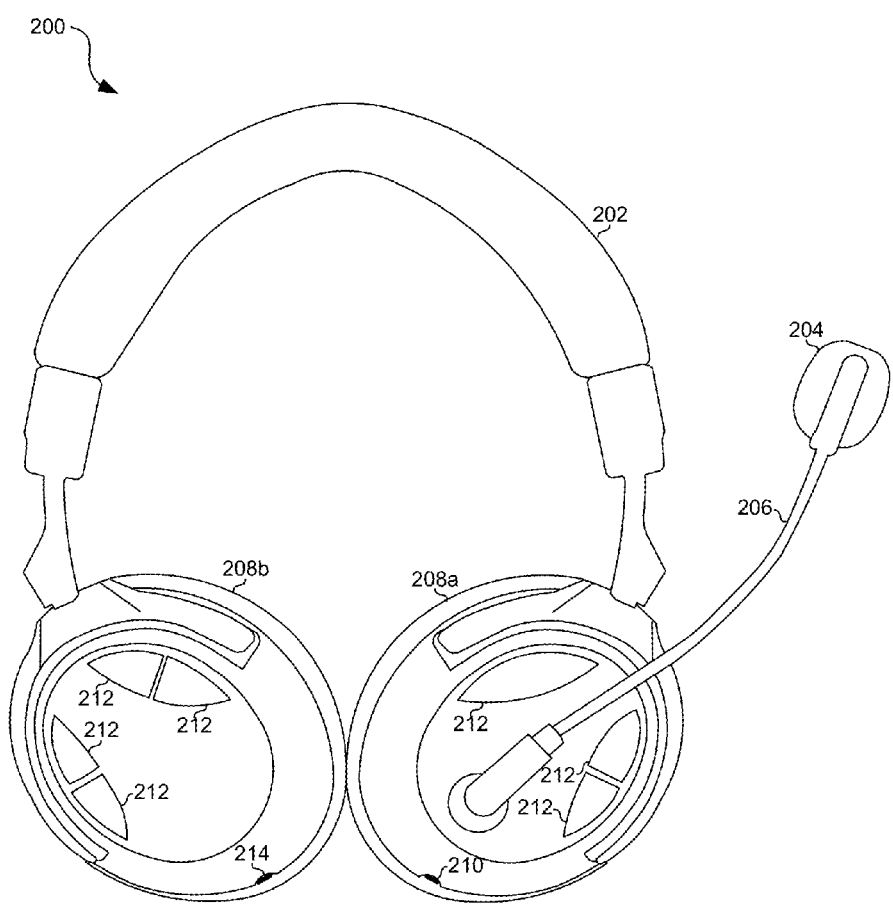

Referring to FIGS. 2A and 2B, there is shown two views of an example headset 200 that may present audio output by a gaming console such as the console 176. The headset 200 comprises a headband 202, a microphone boom 206 with microphone 204, ear cups 208a and 208b which surround speakers 216a and 216b, connector 210, connector 214, and user controls 212.

The connector 210 may be, for example, a 3.5 mm headphone socket for receiving analog audio signals (e.g., receiving chat audio via an Xbox "talkback" cable).

The microphone 204 converts acoustic waves (e.g., the voice of the person wearing the headset) to electric signals for processing by circuitry of the headset and/or for output to a device (e.g., console 176, basestation 300, a smartphone, and/or the like) that is in communication with the headset.

The speakers 216a and 216b convert electrical signals to soundwaves.

The user controls 212 may comprise dedicated and/or programmable buttons, switches, sliders, wheels, etc. for performing various functions. Example functions which the controls 212 may be configured to perform include: power the headset 200 on/off, mute/unmute the microphone 204, control gain/volume of, and/or effects applied to, chat audio by the audio processing circuitry of the headset 200, control gain/volume of, and/or effects applied to, game audio by the audio processing circuitry of the headset 200, enable/disable/initiate pairing (e.g., via Bluetooth, Wi-Fi direct, or the like) with another computing device, and/or the like.

The connector 214 may be, for example, a USB port. The connector 214 may be used for downloading data to the headset 200 from another computing device and/or uploading data from the headset 200 to another computing device. Such data may include, for example, parameter settings (described below). Additionally, or alternatively, the connector 214 may be used for communicating with another computing device such as a smartphone, tablet compute, laptop computer, or the like.

Figure 2C:
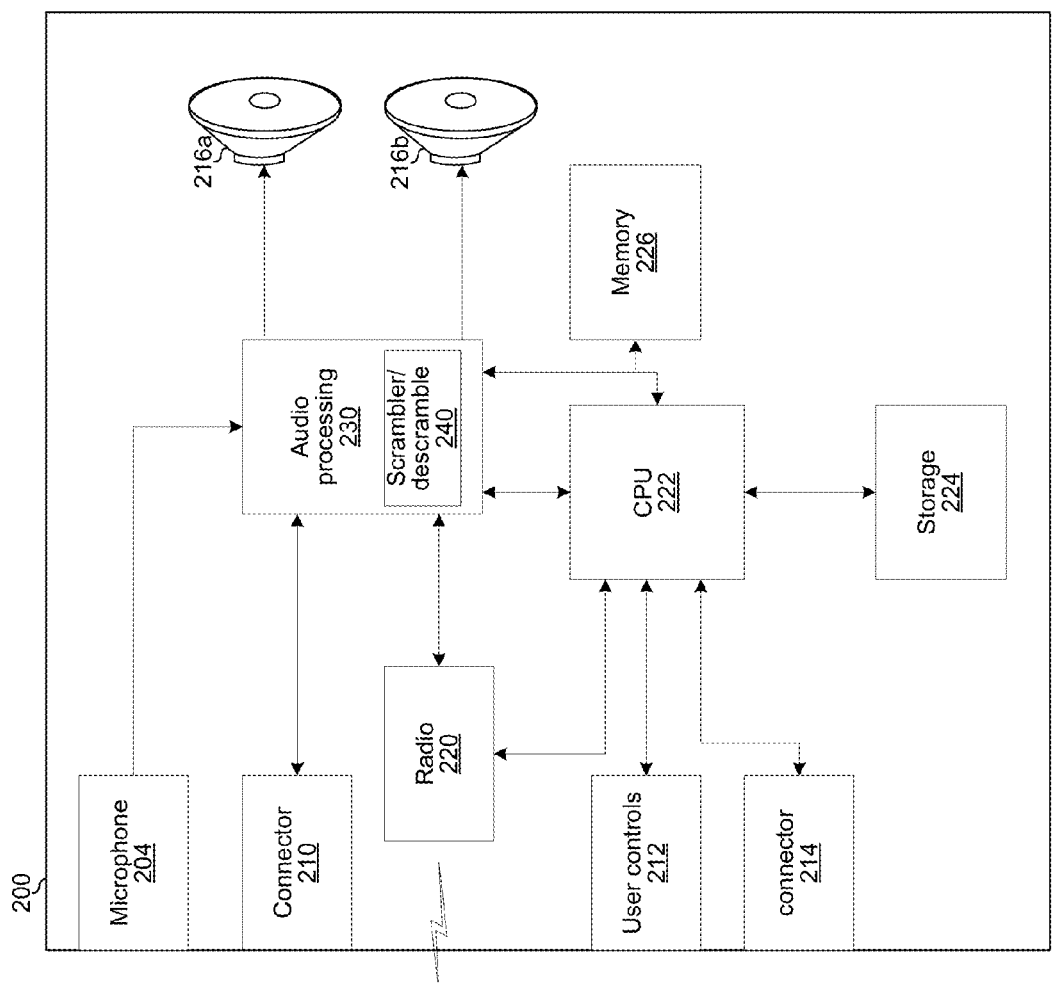
FIG. 2C depicts a block diagram of the example headset of FIGS. 2A and 2B.

FIG. 2C depicts a block diagram of the example headset 200. In addition to the connector 210, user controls 212, connector 214, microphone 204, and speakers 216a and 216b already discussed, shown are a radio 220, a CPU 222, a storage device 224, a memory 226, and an audio processing circuit 230.

The radio 220 may comprise circuitry operable to communicate in accordance with one or more standardized (such as, for example, the IEEE 802.11 family of standards, the Bluetooth family of standards, and/or the like) and/or proprietary wireless protocol(s) (e.g., a proprietary protocol for receiving audio from an audio basestation such as the basestation 300).

The CPU 222 may comprise circuitry operable to execute instructions for controlling/coordinating the overall operation of the headset 200. Such instructions may be part of an operating system or state machine of the headset 200 and/or part of one or more software applications running on the headset 200. In some implementations, the CPU 222 may be, for example, a programmable interrupt controller, a state machine, or the like.

The storage device 224 may comprise, for example, FLASH or other nonvolatile memory for storing data which may be used by the CPU 222 and/or the audio processing circuitry 230. Such data may include, for example, parameter settings that affect processing of audio signals in the headset 200 and parameter settings that affect functions performed by the user controls 212. For example, one or more parameter settings may determine, at least in part, a gain of one or more gain elements of the audio processing circuitry 230. As another example, one or more parameter settings may determine, at least in part, a frequency response of one or more filters that operate on audio signals in the audio processing circuitry 230. As another example, one or more parameter settings may determine, at least in part, whether and which sound effects are added to audio signals in the audio processing circuitry 230 (e.g., which effects to add to microphone audio to morph the user's voice). Example parameter settings which affect audio processing are described in the co-pending U.S. patent application Ser. No. 13/040,144 titled "Gaming Headset with Programmable Audio" and published as US2012/0014553, the entirety of which is hereby incorporated herein by reference. Particular parameter settings may be selected autonomously by the headset 200 in accordance with one or more algorithms, based on user input (e.g., via controls 212), and/or based on input received via one or more of the connectors 210 and 214.

The memory 226 may comprise volatile memory used by the CPU 230 and/or audio processing circuit 230 as program memory, for storing runtime data, etc.

The audio processing circuit 230 may comprise circuitry operable to perform audio processing functions such as volume/gain control, compression, decompression, encoding, decoding, introduction of audio effects (e.g., echo, phasing, virtual surround effect, etc.), and/or the like. As described above, the processing performed by the audio processing circuit 230 may be determined, at least in part, by which parameter settings have been selected. The processing may be performed on game, chat, and/or microphone audio that is subsequently output to speaker 216a and 216b. Additionally, or alternatively, the processing may be performed on chat audio that is subsequently output to the connector 210 and/or radio 220.

In an example implementation, the audio processing circuit 230 comprises circuitry 240 operable to perform scrambling and/or descrambling of chat audio. For any particular burst of chat audio, scrambling and descrambling of the burst may use a key or key-pair previously exchanged/established between sender and intended recipient of the audio burst. For example, for a first headset 200 to transmit a scrambled burst of chat audio to a second headset 200 (e.g., via network 106), the circuit 240 of the first headset 200 may scramble the burst using a particular key, and the circuit 240 of the second headset 200 may then use the same key (for symmetric key implementations) or a complementary key (for asymmetric key implementations) to descramble the burst. In an example implementation, the circuit 240 of the second headset 200 may identify the appropriate key for descrambling the burst based on an identification signal prepended, appended, and/or embedded in the audio burst. For example, the circuit 240 in a sending headset 200 may prepend an audio burst with a signal (in an audible or non-audible frequency band) that identifies the sending device, the intended recipient of the burst, and/or a key required for descrambling the burst. Additional example details of scrambling chat audio for private communications among a subset of participants in a gaming chat are described below with reference to FIGS. 5A-6.

Figure 3A:
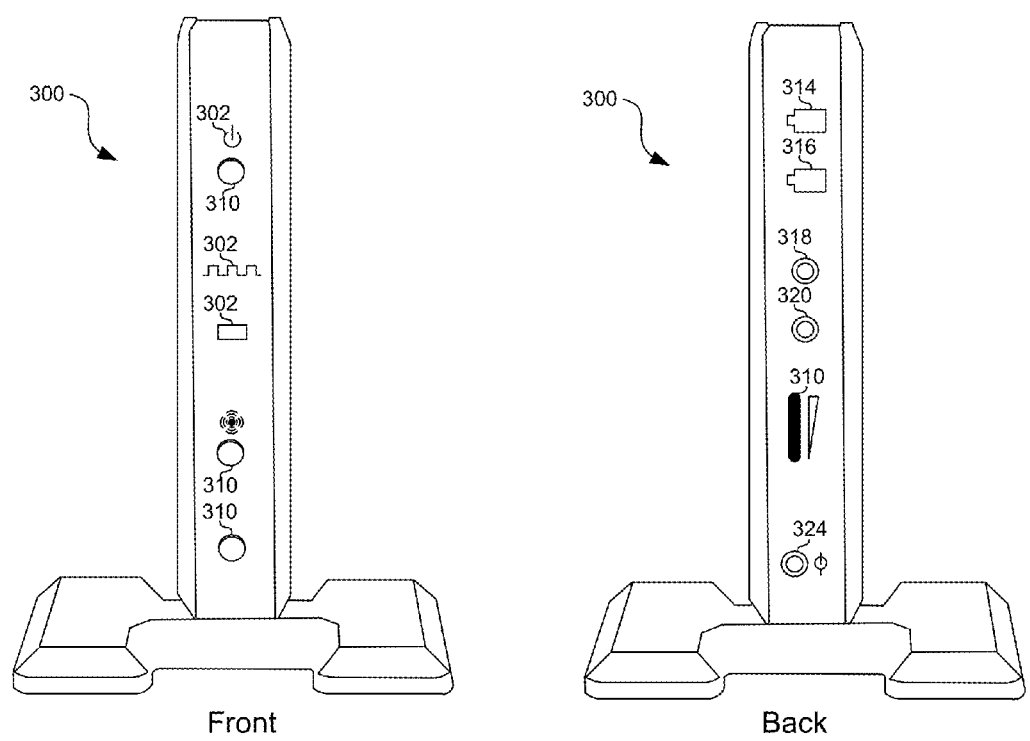
FIG. 3A depicts two views of an example embodiment of an audio basestation.

FIG. 3A depicts two views of an example embodiment of the audio basestation 300. The basestation 300 comprises status indicators 302, user controls 310, power port 324, and audio connectors 314, 316, 318, and 320.

The audio connectors 314 and 316 may comprise digital audio in and digital audio out (e.g., S/PDIF) connectors, respectively. The audio connectors 318 and 320 may comprise a left "line in" and a right "line in" connector, respectively. The controls 310 may comprise, for example, a power button, a button for enabling/disabling virtual surround sound, a button for adjusting the perceived angles of the speakers when the virtual surround sound is enabled, and a dial for controlling a volume/gain of the audio received via the "line in" connectors 318 and 320. The status indicators 302 may indicate, for example, whether the audio basestation 300 is powered on, whether audio data is being received by the basestation 300 via connectors 314, and/or what type of audio data (e.g., Dolby Digital) is being received by the basestation 300.

Figure 3B:
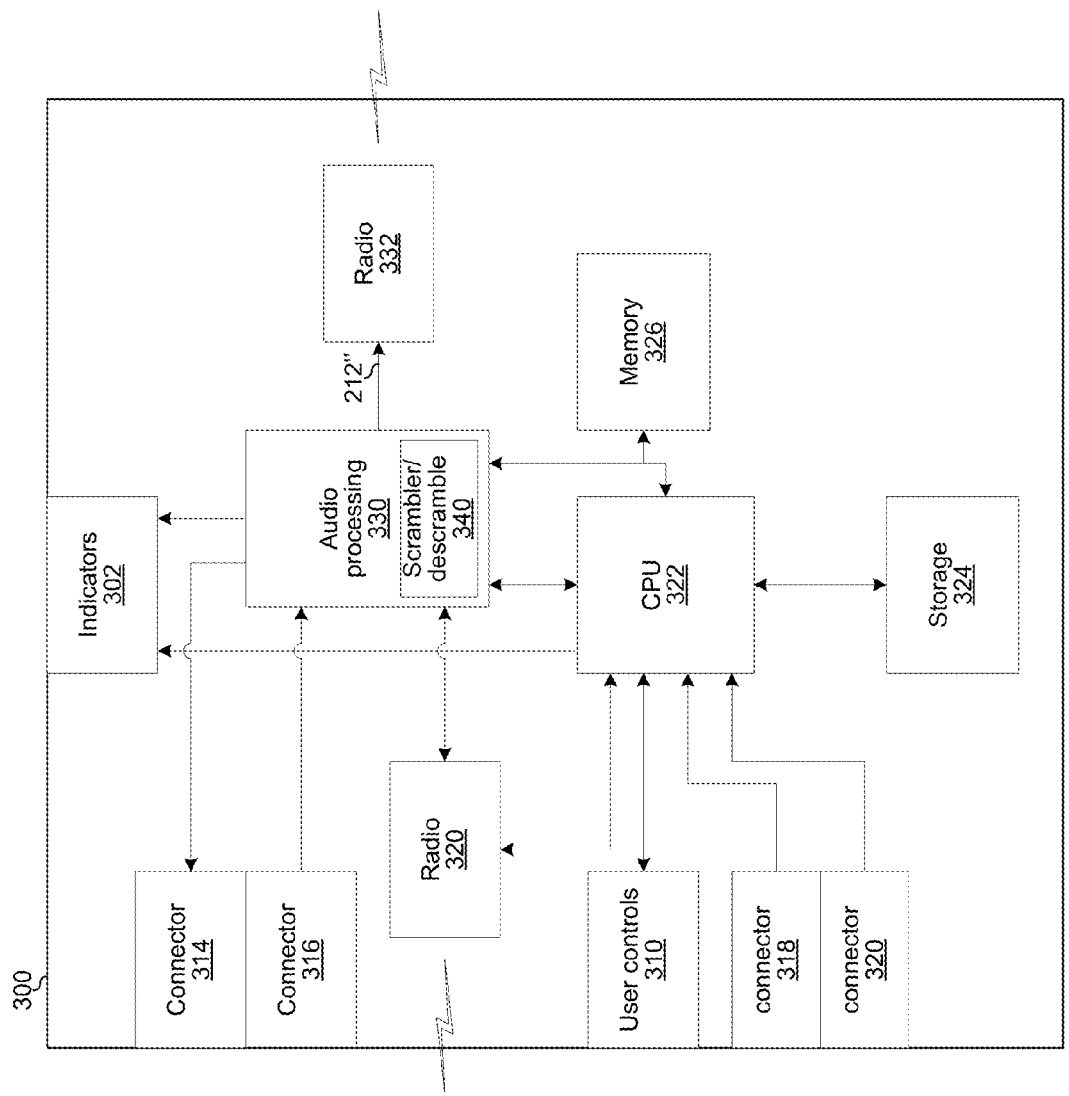
FIG. 3B depicts a block diagram of the audio basestation 400.

FIG. 3B depicts a block diagram of the audio basestation 300. In addition to the user controls 310, indicators 302, and connectors 314, 316, 318, and 320 described above, the block diagram additionally shows a CPU 322, a storage device 324, a memory 326, a radio 320, an audio processing circuit 330, and a radio 332.

The radio 320 comprises circuitry operable to communicate in accordance with one or more standardized (such as the IEEE 802.11 family of standards, the Bluetooth family of standards, and/or the like) and/or proprietary (e.g., proprietary protocol for receiving audio protocols for receiving audio from a console such as the console 176.) wireless protocols.

The radio 332 comprises circuitry operable to communicate in accordance with one or more standardized (such as, for example, the IEEE 802.11 family of standards, the Bluetooth family of standards, and/or the like) and/or proprietary wireless protocol(s) (e.g., a proprietary protocol for transmitting audio to headphones 200).

The CPU 322 comprises circuitry operable to execute instructions for controlling/coordinating the overall operation of the audio basestation 300. Such instructions may be part of an operating system or state machine of the audio basestation 300 and/or part of one or more software applications running on the audio basestation 300. In some implementations, the CPU 322 may be, for example, a programmable interrupt controller, a state machine, or the like.

The storage 324 may comprise, for example, FLASH or other nonvolatile memory for storing data which may be used by the CPU 322 and/or the audio processing circuitry 330. Such data may include, for example, parameter settings that affect processing of audio signals in the basestation 300. For example, one or more parameter settings may determine, at least in part, a gain of one or gain elements of the audio processing circuitry 330. As another example, one or more parameter settings may determine, at least in part, a frequency response of one or more filters that operate on audio signals in the audio processing circuitry 330. As another example, one or more parameter settings may determine, at least in part, whether and which sound effects are added to audio signals in the audio processing circuitry 330 (e.g., which effects to add to microphone audio to morph the user's voice). Example parameter settings which affect audio processing are described in the co-pending U.S. patent application Ser. No. 13/040,144 titled "Gaming Headset with Programmable Audio" and published as US2012/0014553, the entirety of which is hereby incorporated herein by reference. Particular parameter settings may be selected autonomously by the basestation 300 in accordance with one or more algorithms, based on user input (e.g., via controls 310), and/or based on input received via one or more of the connectors 314, 316, 318, and 320.

The memory 326 may comprise volatile memory used by the CPU 322 and/or audio processing circuit 330 as program memory, for storing runtime data, etc.

The audio processing circuit 330 may comprise circuitry operable to perform audio processing functions such as volume/gain control, compression, decompression, encoding, decoding, introduction of audio effects (e.g., echo, phasing, virtual surround effect, etc.), and/or the like. As described above, the processing performed by the audio processing circuit 330 may be determined, at least in part, by which parameter settings have been selected. The processing may be performed on game and/or chat audio signals that are subsequently output to a device (e.g., headset 200) in communication with the basestation 300. Additionally, or alternatively, the processing may be performed on a microphone audio signal that is subsequently output to a device (e.g., console 176) in communication with the basestation 300.

In an example implementation, the audio processing circuit 330 comprises circuit 340 operable to perform scrambling and/or descrambling of chat audio. For any particular burst of chat audio, scrambling and descrambling of the burst may use a key or key-pair previously exchanged/established between sender and intended recipient of the audio burst. For example, for a basestation 300 to transmit a scrambled burst of chat audio to a headset 200, the circuit 340 of the basestation 300 may scramble the burst using a particular key, and the circuit 240 of the headset 200 may then use the same key (for symmetric key implementations) or a complementary key (for asymmetric key implementations) to descramble the burst. As another example, for a first basestation 300 to transmit a scrambled burst of chat audio to a second basestation 300 (e.g., via network 106), the circuit 340 of the first basestation 300 may scramble the burst using a particular key, and the circuit 340 of the second basestation 300 may then use the same key (for symmetric key implementations) or a complementary key (for asymmetric key implementations) to descramble the burst. In an example implementation, the circuit 240 or 340 of the receiving device may identify the appropriate key for descrambling the burst based on an identification signal prepended, appended, and/or embedded in the audio burst. For example, the circuit 340 of the basestation 300 may prepend the audio burst with a signal (in an audible or non-audible frequency band) that identifies the sender of the burst, the intended recipient of the burst, and/or a key required for descrambling the burst. Additional example details of scrambling chat audio for private communications among a subset of participants in a gaming chat are described below with reference to FIGS. 5A-6.

Figure 4:
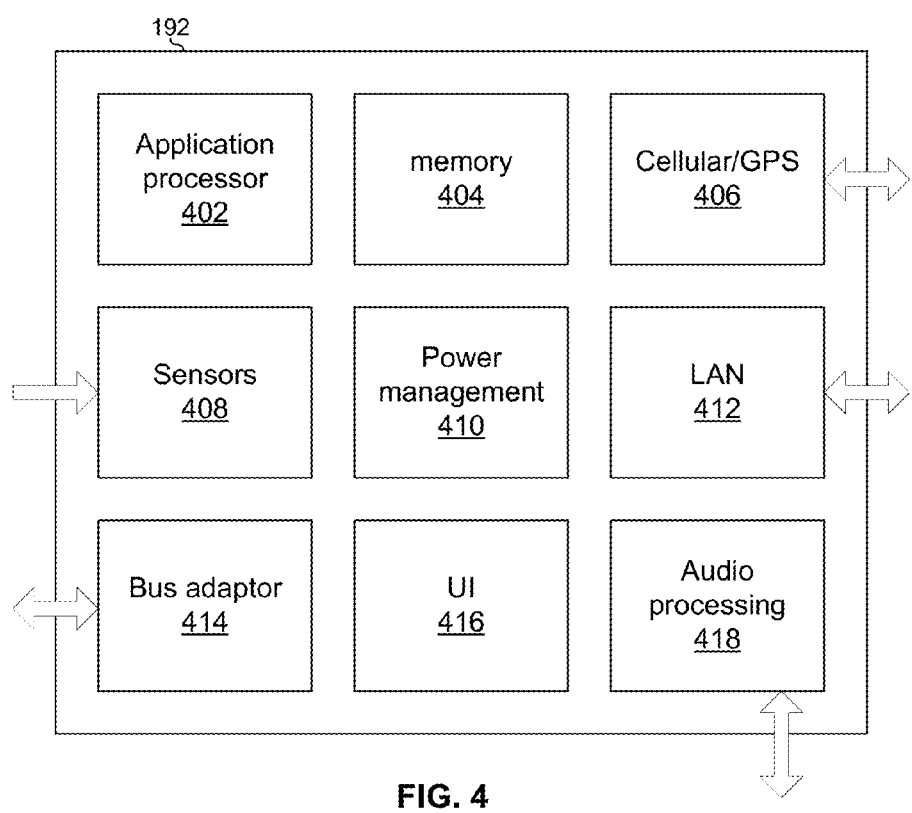
FIG. 4 depicts a block diagram of an example multi-purpose device.

FIG. 4 depicts a block diagram of an example multi-purpose device 192. The example multi-purpose device 192 comprises a an application processor 402, memory subsystem 404, a cellular/GPS networking subsystem 406, sensors 408, power management subsystem 410, LAN subsystem 412, bus adaptor 414, user interface subsystem 416, and audio processor 418.

The application processor 402 comprises circuitry operable to execute instructions for controlling/coordinating the overall operation of the multi-purpose device 192 as well as graphics processing functions of the multi-purpose device 402. Such instructions may be part of an operating system of the device 192 and/or part of one or more software applications running on the device 192.

The memory subsystem 404 comprises volatile memory for storing runtime data, nonvolatile memory for mass storage and long-term storage, and/or a memory controller which controls reads writes to memory.

The cellular/GPS networking subsystem 406 comprises circuitry operable to perform baseband processing and analog/RF processing for transmission and reception of cellular and GPS signals.

The sensors 408 comprise, for example, a camera, a gyroscope, an accelerometer, a biometric sensor, and/or the like.

The power management subsystem 410 comprises circuitry operable to manage distribution of power among the various components of the multi-purpose device 192.

The LAN subsystem 412 comprises circuitry operable to perform baseband processing and analog/RF processing for transmission and reception of wired, optical, and/or wireless signals (e.g., in accordance with Wi-Fi, Wi-Fi Direct, Bluetooth, Ethernet, and/or other standards).

The bus adaptor 414 comprises circuitry for interfacing one or more internal data busses of the multi-purpose device with an external bus (e.g., a Universal Serial Bus) for transferring data to/from the multi-purpose device via a wired connection.

The user interface subsystem 416 comprises circuitry operable to control and relay signals to/from a touchscreen, hard buttons, and/or other input devices of the multi-purpose device 192.

The audio processor 418 comprises circuitry to process (e.g., digital to analog conversion, analog-to-digital conversion, compression, decompression, encryption, decryption, resampling, etc.) audio signals. The audio processor 418 may be operable to receive and/or output signals via a connector such as a 3.5 mm stereo and microphone connector.

Figure 5A:
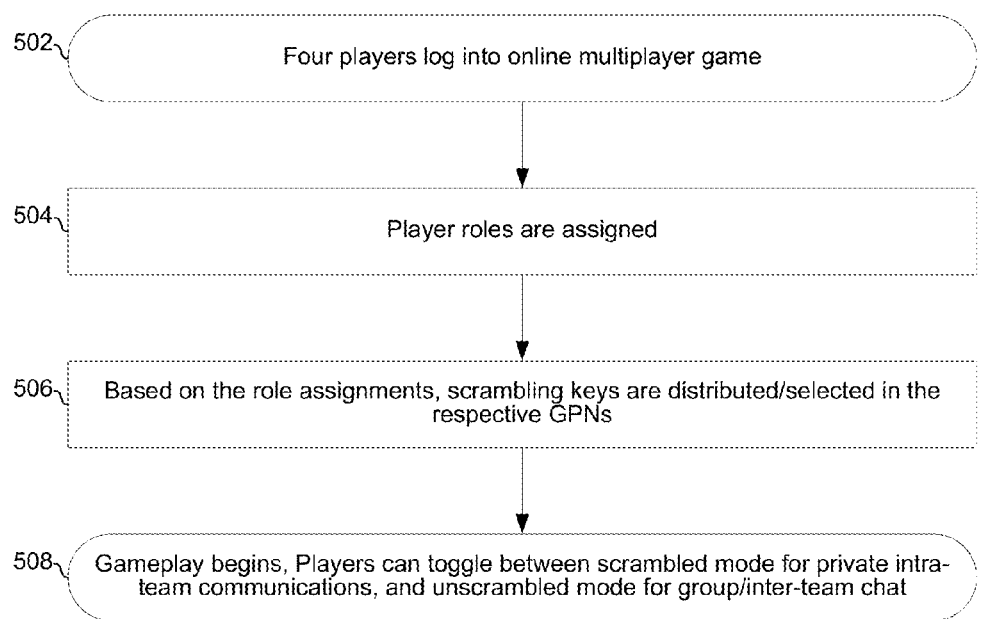
FIG. 5A is a flowchart illustrating an example process for configuring gaming devices to support scrambled and unscrambled gaming chat audio.

FIG. 5A is a flowchart illustrating an example process for configuring gaming devices to support scrambled and unscrambled gaming chat audio. The blocks are described with reference to FIG. 5B.

Figure 5B:
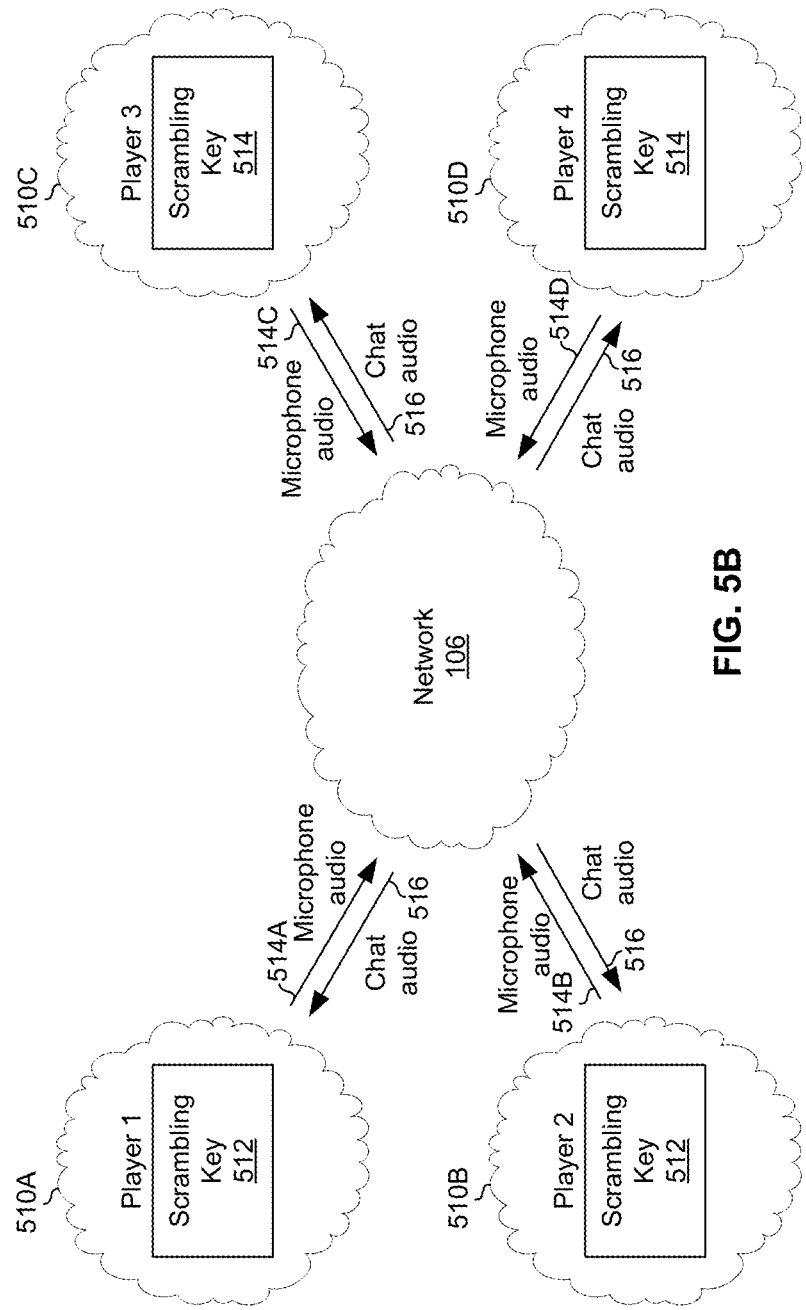
FIG. 5B shows devices configured for scrambled and unscrambled gaming chat audio.

In block 502, four players log into an online multiplayer game (e.g., "Game X"). As shown in FIG. 5B, each of the players may be connected to the game via network 106 via a respective console 176 and GPN 190 (represented as clouds 510 in FIG. 5B).

In block 504, the players' roles in the game are assigned. A player's role may correspond, for example, to which of two or more opposing teams he is on. For illustration, an example scenario in which players 1 and 2 are on a first team, players 3 and 4 are on a second team, and the first team is opposing the second team in the online multiplayer game.

In block 506, based on the player role assignments in block 504, scrambling keys are communicated to and/or selected in the players' headsets. In the example scenario, the result is a headset 200 of player 1 loading and/or selecting a first key (or key pair), a headset 200 of player 2 loading and/or selecting the first key (or key pair), a headset 200 of player 3 loading and/or selecting a second key (or key pair), a headset 200 of player 4 loading and/or selecting the second key (or key pair).

In an example implementation, the server hosting the multiplayer online game may output signal(s) to the headsets 200, via the respective consoles 176, indicating the role of the various players. In this manner, the configuration of headsets may be fully automated without need for the players to take extra actions to configure the scrambling keys of their headsets.

In an example implementation, an application running on multi-purpose devices 192 associated with the respective players and their headsets may present an interface for selecting each of the players' roles in the online multiplayer game. In response to one or more of the players inputting the players' respective roles into their devices 192, the multi-purpose devices 192 may communicate with one another (e.g., via the network 106) to ensure that each player has selected the correct role, and then output a signal to their respective headsets to load and/or select the appropriate scrambling keys.

In an example implementation, scrambling keys themselves, or identifiers of scrambling keys, may be communicated to the players' respective multi-purpose devices 192 (e.g., via email, SMS, MMS, a push notification, and/or the like). Each multi-purpose device 192 may then load/configure (either automatically or in response to a user input) the associated headset 200 with the received or identified key (e.g., via a Bluetooth connection between the headset 200 and multi-purpose device 192).

In an example implementation, a player may select a scrambling key via an app running on his/her multi-purpose device 192 and select which other players should receive the key. In response to these selections, the multi-purpose device 192 may then load/configure the player's headset with the selected key and transmit (e.g., via text, SMS, MMS, a push notification, and/or the like) the key, or an identifier of the key, to the multi-purpose device(s) 192 of the selected player(s).

In block 508, gameplay begins and the microphone audio signals 514 from the four players are conveyed into the network 106 where they are combined into a common chat audio signal 516 which is then output to the players via their respective consoles 176 and headsets 200. An example chat audio stream and the resulting audio in the players' headsets are described below with reference to FIG. 7A.

Figure 6:
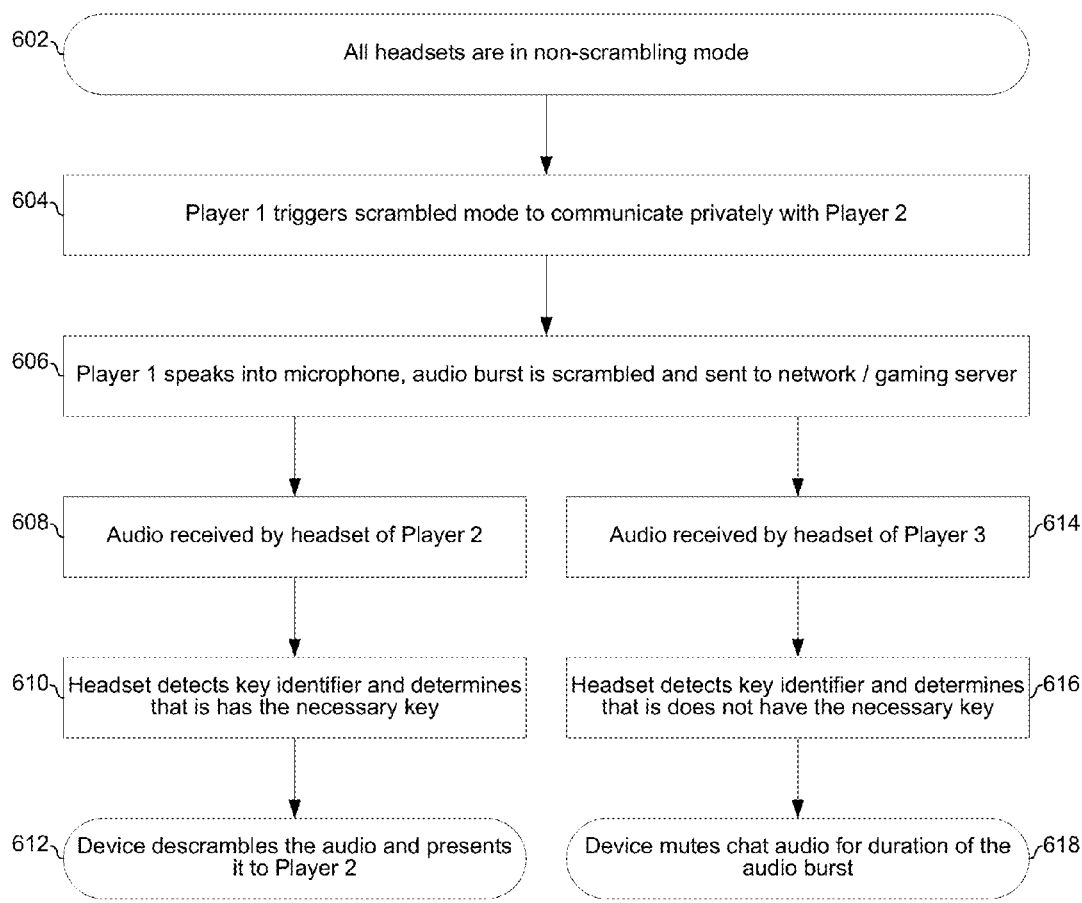
FIG. 6 is a flowchart illustrating example processing of chat audio in a gaming system where scrambling of chat audio is supported.

FIG. 6 is a flowchart illustrating example processing of chat audio in a gaming system where scrambling of chat audio is supported.

In block 602, each of the four players in the example scenario has his/her headset in a non-scrambling mode. As a result, each microphone signal 514 carries unscrambled microphone audio from each of the players headsets to the network 106 where they are combined into the chat signal 516 which is then output to the headsets. Because each headset is a non-scrambling mode, all the microphone audio is intelligible to all the players. It should be noted that "scrambling" as used here, refers to scrambling of audio (in the digital and/or analog domain) such that the audio becomes unintelligible to a human listener if not descrambled prior to presenting the audio to the listener. "Scrambling" as used herein does not refer to scrambling that is done in a transmitter to give the data useful engineering properties, and that is reversed as a matter of course in the receiver. For distinction, this latter type of processing may be referred to as "randomization" and is often paired with a forward error correction mechanism.

In block 604, Player 1 switches his/her headset to scrambling mode to enable a private communication with Player 2. The switch to scrambling mode may be effected by, for example, pressing one of the buttons 212 on the headset 200 and/or via a user interface of a multi-purpose device 192 in use by Player 1.

In block 606, Player 1 speaks into the microphone of his/her headset 200, the resulting microphone audio signal is scrambled by circuitry 240 of the headset 200, and the scrambled audio is then transmitted (e.g., via console 176 in use by Player 1) to one or more servers of the network 106 that are hosting the group chat for the game.

In an example implementation, the scrambled audio may be communicated along with a key identifier—information that enables a headset receiving the scrambled audio to identify a key needed for descrambling the audio. For example, a tone or sequence of tones (e.g., near the upper or lower end of the audio band such that it is inaudible, or nearly so) may be added to the scrambled audio. The tone(s) (e.g., their frequency and/or duration) may directly identify the descrambling key (e.g., where the keys are given unique identifiers) and/or may provide information (e.g., which player's headset sent the audio, which player's headset is intended to receive the audio, and/or which key was used to scramble the audio) from which the identity of the key may be extrapolated.

For the headset 200 of Player 2 (i.e., a headset 200 in which the necessary key(s) for descrambling audio from the headset 200 of Player 1 has been loaded/selected), reception of the audio transmitted in block 606 proceeds via blocks 608-612. For the headset 200 of Players 3 and 4 (i.e., headsets 200 in which the necessary key(s) for descrambling audio from the headset 200 of Player 1 have not been loaded/selected), reception of the audio transmitted in block 606 proceeds via blocks 614-618.

In block 608, the scrambled audio is received by headset 200 of Player 2. In block 610, the headset 200 of Player 2 detects that the received audio is scrambled (e.g., based on detecting a key identifier and/or a begin-scrambling indicator that is received along with the scrambled audio), and determines that it has been configured/loaded with the proper key for decrypting this audio. In block 612, the audio processing circuitry 240 descrambles the received audio and outputs it to Player 2 via the speakers 216.

In block 614, the scrambled audio is received by headset 200 of Player 3. In block 616, the headset 200 of Player 3 detects that the received audio is scrambled (e.g., based on detecting a key identifier and/or a begin-scrambling indicator that is received along with the scrambled audio), and determines that it has not been configured/loaded with the proper key for decrypting this audio. In block 618, the audio processing circuitry 240 of the headset 200 of Player 3 mutes the chat audio for the duration of the scrambled audio from Player 1 (e.g., for the duration between a begin-scrambling indicator and an end-scrambling indicator). The muting may prevent Player 3 from having to listen to the unintelligible audio. Game audio may continue to be presented while the chat audio is muted, or both chat and game audio may be muted.

Figure 7B:
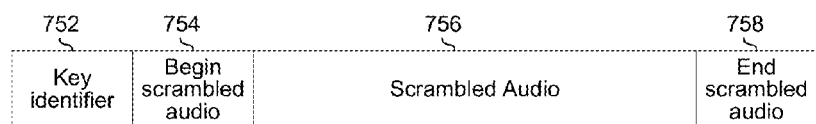
FIG. 7B depicts an example scrambled audio burst communicated by a gaming headset that supports scrambling for private conversations among a subset of game chat participants.
Figure 7A:
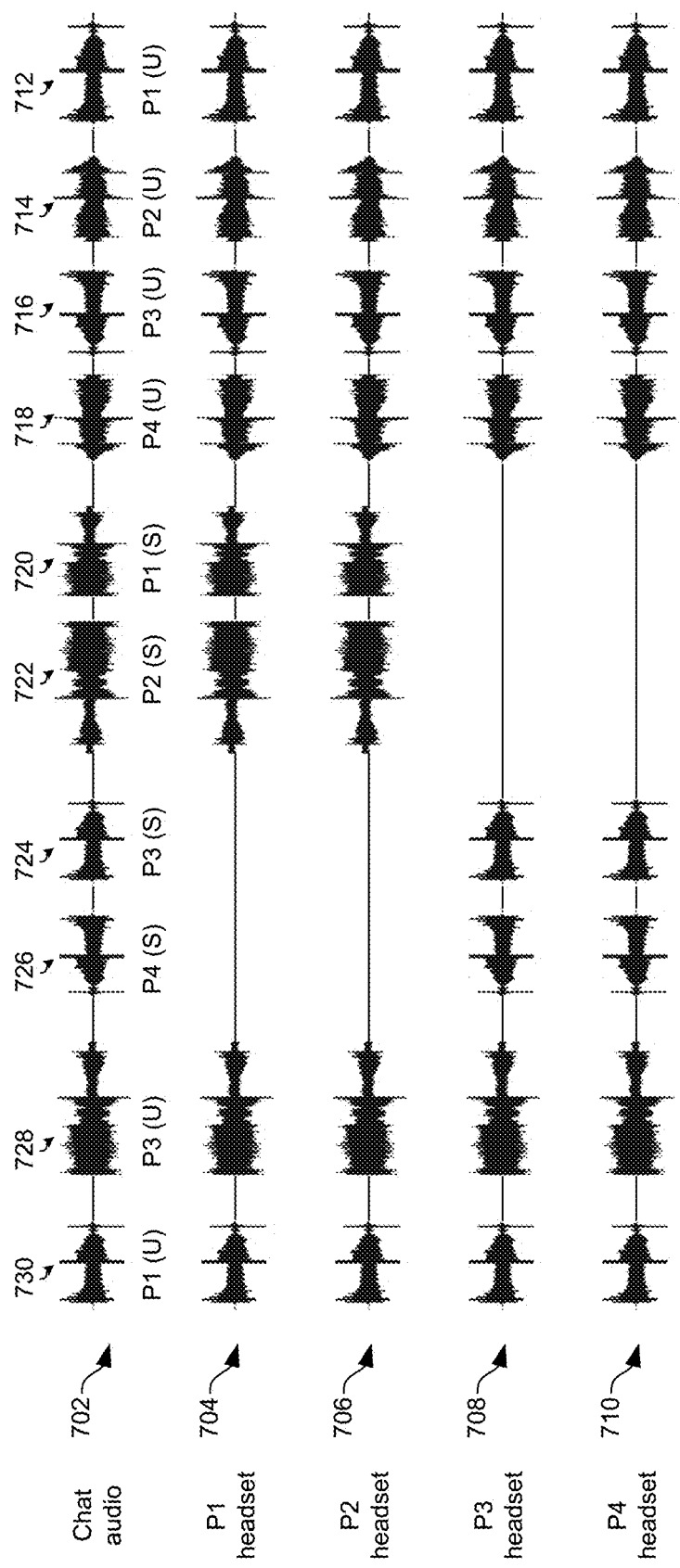
FIG. 7A shows a portion of an example chat audio stream and the results of the example audio stream in the headsets of four players of two opposing teams in an online multi-player game.

FIG. 7A shows a portion of an example chat audio stream and the results of the example audio stream in the headsets of the four players described above with reference to FIGS. 5A and 5B. Shown is an example chat audio signal 702 which comprises bursts 712-730. Also shown are the resulting audio signals output via the speakers of the headsets of the various Players.

Unscrambled burst 712 from Player 1 is output via speakers of all four headsets. Unscrambled burst 714 from Player 2 is output via speakers of all four headsets. Unscrambled burst 716 from Player 3 is output via speakers of all four headsets. Unscrambled burst 718 from Player 4 is output via speakers of all four headsets.

Burst 720 from Player 1 is scrambled by the headset 200 of Player 1. Headsets 200 worn by Players 1 and 2 descramble and output burst 720 via their speakers 216, but headsets 200 worn by Players 3 and 4 cannot descramble burst 720 and, therefore, mute the chat audio during the burst 720.

Burst 722 from Player 2 is scrambled by the headset 200 of Player 2. Headsets 200 worn by Players 1 and 2 descramble and output burst 722 via their speakers 216, but headsets 200 worn by Players 3 and 4 cannot descramble burst 722 and, therefore, mute the chat audio during the burst 722.

Burst 724 from Player 3 is scrambled by the headset 200 of Player 3. Headsets 200 worn by Players 3 and 4 descramble and output burst 724 via their speakers 216, but headsets 200 worn by Players 1 and 2 cannot descramble burst 724 and, therefore, mute the chat audio during the burst 724.

Burst 726 from Player 4 is scrambled by the headset 200 of Player 4. Headsets 200 worn by Players 3 and 4 descramble and output burst 726 via their speakers 216, but headsets 200 worn by Players 1 and 2 cannot descramble burst 726 and, therefore, mute the chat audio during the burst 726.

Unscrambled burst 728 from Player 3 is output via speakers of all four headsets. Unscrambled burst 730 from Player 1 is output via speakers of all four headsets.

FIG. 7B depicts an example scrambled audio burst communicated by a gaming headset that supports scrambling for private conversations among a subset of game chat participants. The burst comprises a key identifier 752 appended by a headset 200 which generated the audio burst. The identifier 752 may be added to the burst in the analog and/or digital domain. The burst comprises a begin-scrambling indicator 754 which a headset 200 (or other device) may detect to trigger descrambling of the received chat audio signal. The begin-scrambling indicator 754 may be added to the burst in the analog and/or digital domain. The burst comprises scrambled audio 756 which, if output to speaker without descrambling is unintelligible to a human listener. The burst comprises an end-scrambling indicator 758 which a headset 200 (or other device) may detect to cease descrambling of the received chat audio signal. The end-scrambling indicator 758 may be added to the burst in the analog and/or digital domain.

In an example implementation, an electronic device (e.g., console 176, a server of network 106 that hosts an online multiplayer game, basestation 300, headset 200, or the like) may be configurable to operate in a scrambling mode and a non-scrambling mode while processing chat audio and microphone audio for a first player participating in an online multiplayer game via a game console (e.g., console 176). While operating in the non-scrambling mode, the electronic device may be configured to transmit the microphone audio to the game console without scrambling the microphone audio. While operating in the scrambling mode, the electronic device may be configured to scramble the microphone audio and transmit the scrambled microphone audio to the game console. The electronic device may be operable to select a scrambling key used to scramble the microphone audio based on a signal received by the electronic device that indicates a role of the player in the online multiplayer game. The role of the player may correspond to which of two or more opposing teams the first player is a member of in the online multiplayer game. The signal may be received over a communication link between the electronic device and the game console (e.g., a link comprising links 122 and 180). The signal may be received over a communication link between the electronic device and a gaming peripheral device (e.g., a Bluetooth link). While operating in the scrambling mode, the electronic device may transmit a key identifier along with the scrambled microphone audio. The key identifier may enable an electronic device of a second player of the online multiplayer game to determine which descrambling key to use for descrambling the scrambled microphone audio. The electronic device may be operable to determine whether a key for descrambling the chat audio is available to it based on the key identifier. The electronic device may be configured to descramble the chat audio if the key for descrambling the chat audio is available to the electronic device. The electronic device may be configured to mute the chat audio if the key for descrambling the chat audio is not available to the electronic device. The electronic device may be configured to apply a descrambling process to the chat audio from a begin-scrambling indicator until an end-scrambling indicator if the key for descrambling the chat audio is available to the electronic device. The electronic device may be configured to mute the chat audio from the begin-scrambling indicator until the end-scrambling indicator if the key for descrambling the chat audio is not available to the electronic device. While operating in the scrambling mode, the electronic device may transmit a begin-scrambling indicator and an end-scrambling indicator along with the scrambled microphone audio. The electronic is operable to toggle between the scrambling mode and the non-scrambling mode in response to an actuation (e.g., a press of a button (e.g., 212), voice command, etc.) of the electronic device.

The present method and/or system may be realized in hardware, software, or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

What is claimed is:

1. A headset that comprises a microphone and circuitry that is configurable to operate in a scrambling mode and a non-scrambling mode while processing chat audio and microphone audio for a first player participating in an online multiplayer game via a game console, wherein:
    while operating in said non-scrambling mode, said circuitry of said headset is configured to transmit said microphone audio to said game console without scrambling said microphone audio;
    while operating in said scrambling mode, said circuitry of said headset is configured to scramble said microphone audio and transmit said scrambled microphone audio to said game console; and
    said circuitry of said headset is operable to:
        determine whether a key for descrambling said chat audio is available to said circuitry of said headset based on a key identifier;
        apply a descrambling process to said chat audio from a begin-scrambling indicator until an end-scrambling indicator when said key for descrambling said chat audio is available to said circuitry of said headset; and
        mute said chat audio from said begin-scrambling indicator until said end-scrambling indicator when said key for descrambling said chat audio is not available to said circuitry of said headset.

2. The headset of claim 1, wherein said signal indicates a role of said first player in said online multiplayer game.

3. The headset of claim 2, wherein said role of said first player corresponds to which of two or more opposing teams said first player is a member of in said online multiplayer game.

4. The headset of claim 1, wherein said signal is received over one of: a communication link between said circuitry of said headset and said game console, and a communication link between said circuitry of said headset and a gaming peripheral device.

5. The headset of claim 1, wherein said circuitry of said headset is operable to scramble said microphone audio using a scrambling key.

6. The headset of claim 5, wherein:
while operating in said scrambling mode, said circuitry of said headset is operable to transmit said key identifier along with said scrambled microphone audio; and
said key identifier enables circuitry of a headset of a second player of said online multiplayer game to determine which descrambling key to use for descrambling said scrambled microphone audio.

7. The headset of claim 1, wherein said circuitry of said headset is operable to:
descramble said chat audio when said key for descrambling said chat audio is available to said circuitry of said headset; and
mute said chat audio when said key for descrambling said chat audio is not available to said circuitry of said headset.

8. The headset of claim 1, wherein while operating in said scrambling mode, said circuitry of said headset transmits said begin-scrambling indicator and said end-scrambling indicator along with said scrambled microphone audio.

9. The headset of claim 1, wherein said circuitry of said headset is operable to toggle between said scrambling mode and said non-scrambling mode in response to a press of a button of said headset.

10. A method comprising:
in a headset that comprises a microphone and circuitry that is configurable to operate in a scrambling mode and a non-scrambling mode while processing chat audio and microphone audio for a first player participating in an online multiplayer game via a game console:
while operating in said non-scrambling mode, transmitting said microphone audio to said game console without scrambling said microphone audio;
while operating in said scrambling mode, scrambling said microphone audio and transmit said scrambled microphone audio to said game console;
determining whether a key for descrambling said chat audio is available to said circuitry of said headset based on a key identifier;
applying a descrambling process to said chat audio from a begin-scrambling indicator until an end-scrambling indicator when said key for descrambling said chat audio is available to said circuitry of said headset; and
muting said chat audio from said begin-scrambling indicator until said end-scrambling indicator when said key for descrambling said chat audio is not available to said circuitry of said headset.

11. The method of claim 10, wherein said signal indicates a role of said first player in said online multiplayer game.

12. The method of claim 11, wherein said role of said player corresponds to which of two or more opposing teams said first player is a member of in said online multiplayer game.

13. The method of claim 10, comprising scrambling said microphone audio using a scrambling key based on a received signal.

14. The method of claim 13, wherein said signal is received over one of: a communication link between said circuitry of said headset and said game console, and a communication link between said circuitry of said headset and a gaming peripheral device.

15. The method of claim 13, comprising:
while operating in said scrambling mode, transmitting said key identifier along with said scrambled microphone audio, wherein said key identifier enables circuitry of a headset of a second player of said online multiplayer game to determine which descrambling key to use for descrambling said scrambled microphone audio.

16. The method of claim 10, comprising:
descrambling said chat audio when said key for descrambling said chat audio is available to said circuitry of said headset; and
muting said chat audio when said key for descrambling said chat audio is not available to said circuitry of said headset.

17. The method of claim 10, comprising, while operating in said scrambling mode, transmitting said begin-scrambling indicator and said end-scrambling indicator along with said scrambled microphone audio.

18. The method of claim 10, comprising toggling between said scrambling mode and said non-scrambling mode in response to a press of a button of said headset.

19. A headset that comprises a microphone and circuitry that is configurable to operate in a scrambling mode and a non-scrambling mode while processing chat audio and microphone audio for a first player participating in an online multiplayer game via a game console, wherein:
while operating in said non-scrambling mode, said circuitry of said headset is configured to transmit said microphone audio to said game console without scrambling said microphone audio;
while operating in said scrambling mode, said circuitry of said headset is configured to scramble said microphone audio and transmit said scrambled microphone audio to said game console; and
said circuitry of said headset is operable to:
determine whether a key for descrambling said chat audio is available to said circuitry of said headset based on a key identifier;
descramble said chat audio when said key for descrambling said chat audio is available to said circuitry of said headset; and
mute said chat audio when said key for descrambling said chat audio is not available to said circuitry of said headset.

20. The headset of claim 19, wherein said signal indicates a role of said first player in said online multiplayer game.

21. The headset of claim 20, wherein said role of said first player corresponds to which of two or more opposing teams said first player is a member of in said online multiplayer game.

22. The headset of claim 19, wherein said signal is received over one of: a communication link between said circuitry of said headset and said game console, and a communication link between said circuitry of said headset and a gaming peripheral device.

23. The headset of claim 19, wherein said circuitry of said headset is operable to scramble said microphone audio using a scrambling key.

24. The headset of claim 23, wherein:
while operating in said scrambling mode, said circuitry of said headset is operable to transmit said key identifier along with said scrambled microphone audio; and
said key identifier enables circuitry of a headset of a second player of said online multiplayer game to determine which descrambling key to use for descrambling said scrambled microphone audio.

25. The headset of claim 19, wherein said circuitry of said headset is operable to toggle between said scrambling mode and said non-scrambling mode in response to a press of a button of said headset.

26. A method comprising:
   in a headset that comprises a microphone and circuitry that is configurable to operate in a scrambling mode and a non-scrambling mode while processing chat audio and microphone audio for a first player participating in an online multiplayer game via a game console:
   while operating in said non-scrambling mode, transmitting said microphone audio to said game console without scrambling said microphone audio;
   while operating in said scrambling mode, scrambling said microphone audio and transmitting said scrambled microphone audio to said game console;
   determining whether a key for descrambling said chat audio is available to said circuitry of said headset based on a key identifier;
   descrambling said chat audio when said key for descrambling said chat audio is available to said circuitry of said headset; and
   muting said chat audio when said key for descrambling said chat audio is not available to said circuitry of said headset.

27. The method of claim 26, wherein said signal indicates a role of said first player in said online multiplayer game.

28. The method of claim 27, wherein said role of said player corresponds to which of two or more opposing teams said first player is a member of in said online multiplayer game.

29. The method of claim 26, comprising scrambling said microphone audio using a scrambling key based on a received signal.

30. The method of claim 29, wherein said signal is received over one of: a communication link between said circuitry of said headset and said game console, and a communication link between said circuitry of said headset and a gaming peripheral device.

31. The method of claim 29, comprising:
   while operating in said scrambling mode, transmitting said key identifier along with said scrambled microphone audio, wherein said key identifier enables circuitry of a headset of a second player of said online multiplayer game to determine which descrambling key to use for descrambling said scrambled microphone audio.

32. The method of claim 26, comprising toggling between said scrambling mode and said non-scrambling mode in response to a press of a button of said headset.

\* \* \* \* \*